United States Patent [19]

Duckeck et al.

[11] Patent Number: 5,020,143

[45] Date of Patent: May 28, 1991

[54] VEHICULAR RADIO RECEIVER WITH STORED DETOUR DATA

[75] Inventors: Ralf Duckeck; Peter Brägas, both of Hildesheim, Fed. Rep. of Germany

[73] Assignee: Robert Bosch GmbH, Stuttgart, Fed. Rep. of Germany

[21] Appl. No.: 459,147

[22] Filed: Dec. 29, 1989

[51] Int. Cl.⁵ .......................... H04B 1/06; G08G 1/09

[52] U.S. Cl. .................................... 455/186; 455/228; 455/345; 340/905

[58] Field of Search ................... 455/67, 70, 156, 166, 455/186, 226, 228, 345; 340/988, 990, 955, 905; 364/436, 443, 444, 449

[56] References Cited

U.S. PATENT DOCUMENTS

| | | | |
|---|---|---|---|
| 3,949,401 | 4/1976 | Hegeler et al. | 343/200 |
| 4,380,821 | 4/1983 | Eckhardt | 455/33 |
| 4,435,843 | 3/1984 | Eilers et al. | 455/205 |
| 4,450,589 | 5/1986 | Eilers et al. | 455/205 |
| 4,499,603 | 2/1985 | Eilers | 455/205 |
| 4,862,513 | 8/1989 | Bragas et al. | 455/45 |
| 4,888,699 | 12/1989 | Knoll et al. | 364/449 |

FOREIGN PATENT DOCUMENTS

| | | | |
|---|---|---|---|
| 3536820 | 4/1987 | Fed. Rep. of Germany . | |
| 3633881 | 4/1988 | Fed. Rep. of Germany . | |
| 0095423 | 5/1987 | Japan | 340/995 |

OTHER PUBLICATIONS

Boretz, "Travel Pilot System Set for End-of-Year Debut," Automotive Electronics Journal, Jan. 29, 1990, p. 19.

Specifications of the Radio Data System RDS For VHF/FM Sound Broadcasting (Eur. Bdcastg. Union, Mar. '84)-AU 263 LIB.

Also known as EBU Technical Standard 3244-E (60 pp.).

Map of Area Between Hildesheim (Blaupunkt Hq) & Hamburg, West Germany.

*Primary Examiner*—Reinhard J. Eisenzopf
*Assistant Examiner*—Chi H. Pham
*Attorney, Agent, or Firm*—Frishauf, Holtz, Goodman & Woodward

[57] ABSTRACT

In a vehicular radio receiver having a decoder for decoding digitally encoded received traffic announcements, a memory device for route-specific characteristics and a visual and/or acoustical output device for the traffic announcements are provided. The output is effected by the readout of information from the memory device. To output not only factual information but detour recommendations as well, place names and detour route names are stored in the memory device in jointly addressable memory fields. In transmitting the encoded traffic announcements it is then possible to allow or suppress the output of the already stored detour recommendations only on the basis of a control signal.

9 Claims, 4 Drawing Sheets

COMPLETE PLACE - AND ROUTE REGISTER (1... 65 536)

| h | a | g | f | b |
|---|---|---|---|---|
| 30 422 | HAMBURG-FUHLSBÜTTEL | A7-15 B432-2 | REGION 2 | U15 U16 |
| 31 247 | HANNOVER-OST | A7-64 B2-45 B6-21 | REGION 4 | U42 U43 |
| 32 463 | HILDESHEIM | A7-68 B1-25 B6-27 | REGION 4 | U48 U49 |
| 32 464 | HILDESHEIMER BÖRDO | A7-69 | REGION 4 | U50 U51 |
| 32 465 | HILDESHEIM-DRISPENSTEDT | A7-67 B494-15 | REGION 4 | U46 U47 |

VEHICULAR RADIO RECEIVER WITH STORED DETOUR DATA

Cross-Reference to related U.S. Patents and applications of Robert Bosch GmbH and its subsidiary Blaupunkt Werke GmbH, the disclosures of which are hereby incorporated by reference: U.S. Pat. No. 3,949,401, HEGELER et al., issued Apr. 6,1976, entitled FREQUENCY IDENTIFICATION CIRCUIT FOR BROADCAST TRAFFIC INFORMATION RECEPTION SYSTEMS; U.S. Pat. No. 4,435,843, EILERS & BRAGAS, issued March 1984; U.S. Pat. No. 4,450,589, EILERS & BRAGAS, issued May 1984; U.S. Pat. No. 4,499,603, EILERS, issued February 1985; U.S. Pat. No. 4,862,513, BRAGAS, issued Aug. 29, 1989, entitled RADIO RECEIVER WITH TWO DIFFERENT TRAFFIC INFORMATION DECODERS; U.S.S.N. 307,349, LUBER et al., filed Feb. 7, 1989, entitled POWER CONSERVING SYSTEM FOR RADIO ALERT RECEIVERS German Patent Disclosure DE-OS 39 03 468, LUBER et al., filed Feb. 6, 1989, to which U.S.S.N. 07/469,180 filed Jan. 24, 1990; German Patent Disclosure DE-OS 39 04 344, TEMPELHOF, filed Feb. 14, 1989, to which U.S.S.N. 07/468,703 filed Jan. 23, 1990;

- U.S.S.N. 447,578, DUCKECK, filed Dec. 7, 1989, COMPUTATION-CONSERVING TRAFFIC DATA TRANSMISSION METHOD & APPARATUS;
- U.S.S.N. 447,165, BRAGAS & DUCKECK, filed Dec. 7, 1989, DIGITAL TRAFFIC NEWS EVALUATION;
- U.S.S.N. 447,378, DUCKECK, filed Dec. 7, 1989,ENERGY-CONSERVING STAND-BY FUNCTION IN RADIO TRAFFIC REPORT RECEIVER
- U.S.S.N. 07/459,144, MARDUS, filed Dec. 29, 1989,
- U.S.S.N. 07/459,145, MARDUS, filed Dec. 29, 1989,
- U.S.S.N. 07/459,141, MARDUS, DUCKECK & BRAGAS, filed Dec. 29, 1989,
- U.S.S.N. 07/458,882, DUCKECK & BRAGAS, filed Dec. 29, 1989,
- U.S. Pat. No. 4,888,699, KNOLL et al., issued Dec. 19, 1989 and its C-I-P, U.S.S.N. 07/452,677, KNOLL et al., filed Dec. 18, 1989;

Cross-Reference to related literature

European Broadcasting Union Technical Standard 3244-E, entitled SPECIFICATIONS OF THE RADIO DATA SYSTEM RDS FOR VHF/FM SOUND BROADCASTING (EBU Technical Centre, Brussels, Mar. '84, 60 pp.);

German Patent Disclosure DE-OS 38 06 842, KNOLL, published Sept 14, 1989.

BACKGROUND OF THE INVENTION

The invention relates to a radio receiver according to U.S. Pat. No. 4,862,513, BRAGAS.

German Patent Disclosure DE-OS 35 36 820, BRAGAS & BUSCH, published Apr. 16, 1987, discloses a traffic radio decoder that is equipped to process digital signals. The digital signals are obtained by demodulation of an auxiliary carrier that is broadcast via radio stations along with an FM radio program. Even with RM radio stations, the digital signals can be transmitted by phase modulation of the carrier and recovered in a phase detector. With this kind of transmission, standardized texts, worded in accordance with the formatting principles, like the traffic announcements broadcast in the clear, can be called up from memory locations. The standard texts are present in memories of the receiver and are called up by the digital signals by suitably addressing the memory locations or memory fields. This avpids an annoying interruption of the ongoing radio program. Furthermore, traffic announcements can be transmitted continuously, so that the driver is always up to date.

Transmitting digital signals as addresses of memory locations makes it possible to use a relatively low bit rate for an individual traffic advisory. As a result, a great number of traffic advisories can be repeated cyclically, and they can also be transmitted uniformly mixed, regionally and super-regionally, via the transmitter networks.

Traffic announcements that include not only place information and factual information but also recommended detours require a particularly large informational scope. Such recommended detours are given whenever a traffic obstruction prevails for a relatively long time with a large amount of oncoming traffic, and the driver would reach his destination faster over the longer distance of the detour, sometimes leading through towns and cities, rather than if he were to wait until the traffic obstruction was eliminated.

THE INVENTION

It is an object of the invention to provide the conditions in a vehicular radio receiver that enable a reduction in the scope of data required to transmit detour recommendations.

The invention is based on the thought that detour routes, for instance recommended to circumvent traffic obstructions, begin at an intersection, interchange or exit and end at a more distant intersection, interchange or entrance. Detour routes that can be recommended if there is a traffic obstruction can thus be defined ahead of time. The names of these detour routes are linked to place names that can also be combined with intersections, interchanges or exits from highways or even country roads.

Because the names of the detour routes are stored in memory along with the corresponding place names, only one datum then needs to be transmitted to indicate whether an existing detour is to be recommended or not. Since this is simply a yes/no decision, a considerable reduction in the data scope is attained by transmitting only this decision, rather than all the information on the detour route.

Further features of the invention relate, among other elements, to evaluation circuits that use control signals, included in the RDS data packet or telegram, for activating and/or selecting the data, i.e., place names and detour route names, stored in the memory device.

Thus the desired traffic announcements can be individually assembled within a small scope of data, upon transmission. For example, if place names, road types, route segments and factual information are called from memory locations, this already makes it possible to describe and output 75% of all the possible traffic announcements. By the additional inclusion of detour recommendations in the synthesizable traffic announcements by means of the invention, the degree of coverage of possible traffic announcements can be increased to 90%. It should be stressed in particular that this increase in the transmission takes only a single additional bit.

Overall, with the features according to the invention, the synthesizable traffic announcements can be transmitted within a single cycle of the RDS data packet or telegram. The advantage of digital transmission is thus preserved, that is, that many different traffic announcements can be broadcast, and updating is assured by brief repetition cycles.

In terms of circuitry as well, the advantage of transmission within one data packet or telegram cycle is attained, so that memory devices and combining circuits that would be required to assemble data from different cycles can be dispensed with. DRAWINGS FIG. 1 is a block circuit diagram of a vehicular radio receiving according to the invention;

DETAILED DESCRIPTION

Figure 1:
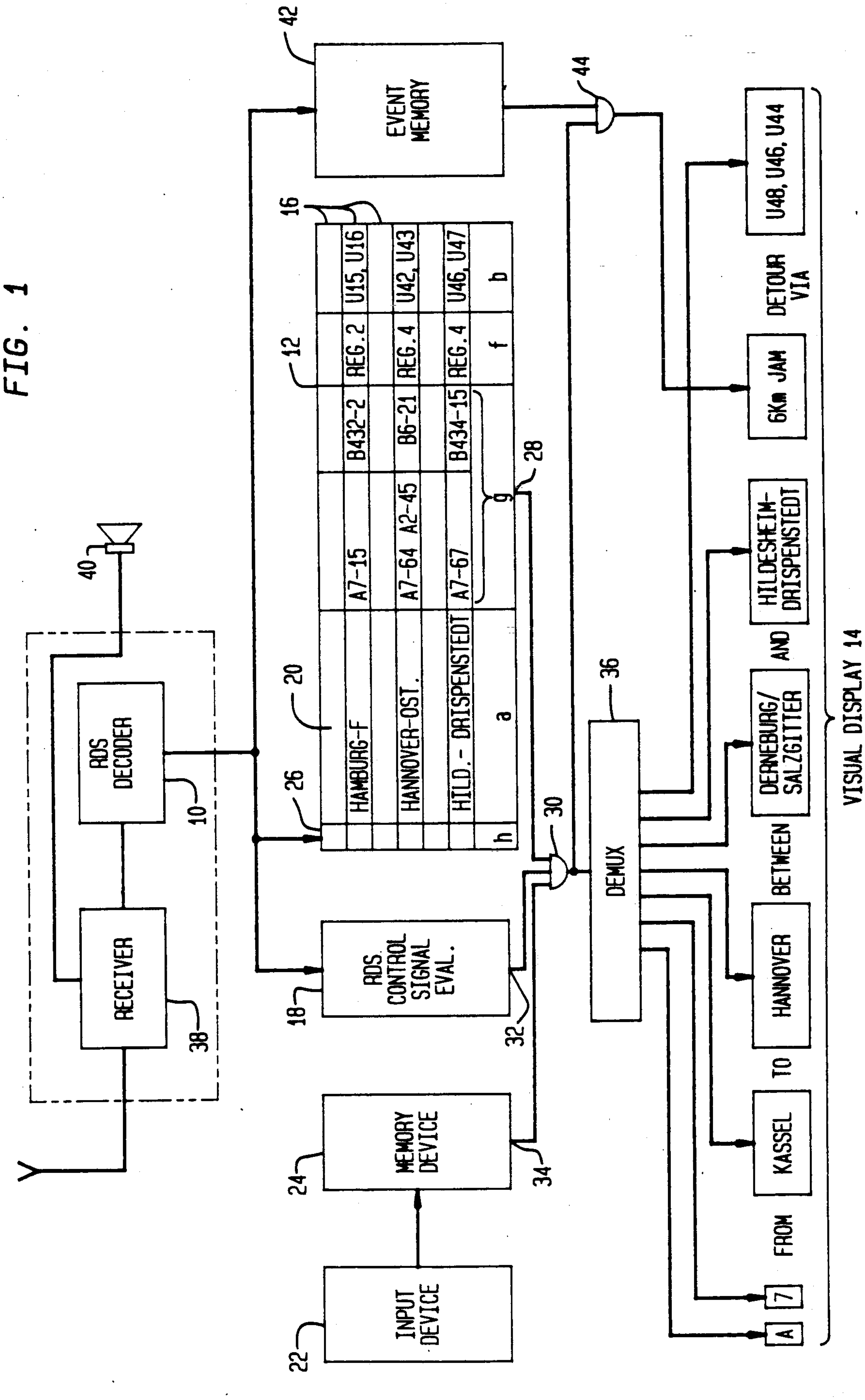

In FIG. 1, a vehicular receiver is shown that includes a receiver element 38 having a loudspeaker 40 and a decoder 10 connected to the output side of the receiver element. The decoder 10 serves to decode digitally encoded, received traffic announcements, specifically in the case of the RDS data packet or telegram the data contained in blocks 2, 3 and 4.

The decoder 10 is connected via an address line to a memory device 12. The memory device 12 includes memory fields 16 that are selectable via address inputs 26 and in which memory locations are present. An output 28 of the memory device 12 leads via a logic linking member 30 to a demultiplexer 36. Subsequent to the demultiplexer 36, the lines branch out to display fields of a visual output device 14.

An evaluation circuit 18 for control signals contained in the RDS data packet or telegram is also provided. These control signals pertain to detours, direction and route segments. One output 32 is carried to the aforementioned logic linking member 30, so that a logical linkage can be made between the signals appearing at the output 28 of the memory device 12 and those appearing at the output 32 of the evaluation circuit 18.

An event memory 42 is also provided, the address inputs of which are likewise triggered by the decoder 10. The output of the event memory 42 leads via a logic linking member 44 to one field of the visual display device 14.

A restriction of the route specific characteristics can be made by means of an input device 22, which is followed on its output side by a further memory device 24, the output 34 of which likewise leads to the logic linking member 30.

In the memory device 12, memory fields 16 are addressed via addresses h. The addressing is done via address input 26. The memory fields 16 have memory locations 20 in which place names a each of which occurs only once are stored in memory. The other memory locations, not specifically identified by reference symbols, include further route-specific characteristics g such as Autobahns or federal highways with exit numbers, memory locations with region names f and memory locations with detour route names b.

The detour route names b designate detour routes that in each case extend from an entrance or exit or intersection or interchange, or in other words from one connecting print to the next. The detour route names are chosen such that the detour routes in one direction have only even numbers, and those in the other direction have only odd numbers. Thus at least two detour route names are associated with each connecting point. In cases where several roads intersect, however, a plurality of detour route names may also be assigned.

By the storage in the memory of the place names a and detour route names b in the same memory fields 16, it is achieved that when a place is named a possible detour route is already defined. The only decision that then needs to be made is whether the detour recommendation is output or not. Compared with an announcement that already includes place information, travel direction and factual information, the additional decision as to whether a detour recommendation will be made or not means only a slight increase in the total data scope required. The evaluation of corresponding detour control signals included in the RDS data packet or telegram takes place in the evaluation circuit 18. If the control signal containing the detour recommendation is encoded for detour recommendation, then upon readout of the detour route names b from the memory device 12, these names are passed on to the demultiplexer 36 via the logic linking member 30, and from the demultiplexer are displayed on the display field for detour recommendations. Contrarily, if the control signal is not encoded for any detour recommendation, then although all the other information from the memory device 12 is delivered to the demultiplexer 36 via the loqic linking member 30, the logic state is changed upon reaching the detour route names b, and the further transmission of this information is suppressed.

If a plurality of detour route names b are assigned to one place name a, as is the case here with the division of the detour route names in terms of travel directions, then in order to select the correct travel direction a travel control signal included in the RDS data packet or telegram is evaluated.

A further feature of the invention makes it possible to make detour recommendations over a plurality of connecting points. This situation can occur if the entrances and exits are very close together and a backup extends over a plurality of connecting points. In that case, a segment control signal contained in the RDS data packet or telegram makes it possible to determine the number of connecting points beyond the one the place name of which is named. In the detour recommendation, the sequential detour route names are transmitted from the succession of detour route names each leading from one connecting points to the next.

Before reaching the next connecting point, the driver then merely needs to look for the next traffic sign with the adjoining detour route, and he can take this detour route or one following it until all the detour routes recommended have been covered.

The association, performed in the memory device 12, of Autobahns (Interstates) and federal highways (e.g. U.S. routes) having exit numbers with the place names, each of which is stored only once, makes it possible to considerably reduce the memory capacity for place names, so that $2^{16}$ different addresses for place names within one advisory area for the Federal Republic of Germany are sufficient.

The additionally provided storage in memory of names f for regions makes it possible, in combination with the input device 22 and the further memory device 24, to make a regional selection of traffic announcements. For example region names f can be specified with which the logio linking member 30 is controlled such that only traffic announcements that match this region are displayed. The region may also be individually selected and in other words is independent of the RDS data packet or telegram.

In the event memory 42, factual information is stored corresponding to standardized advisories. By correspondingly addressing the memory fields in the event memory 42, the corresponding factual information is read out, and on the condition that the other local selected conditions apply, this information is output to the applicable display field in the display device 14, via the logic linking member 44.

Figures 2, 3:
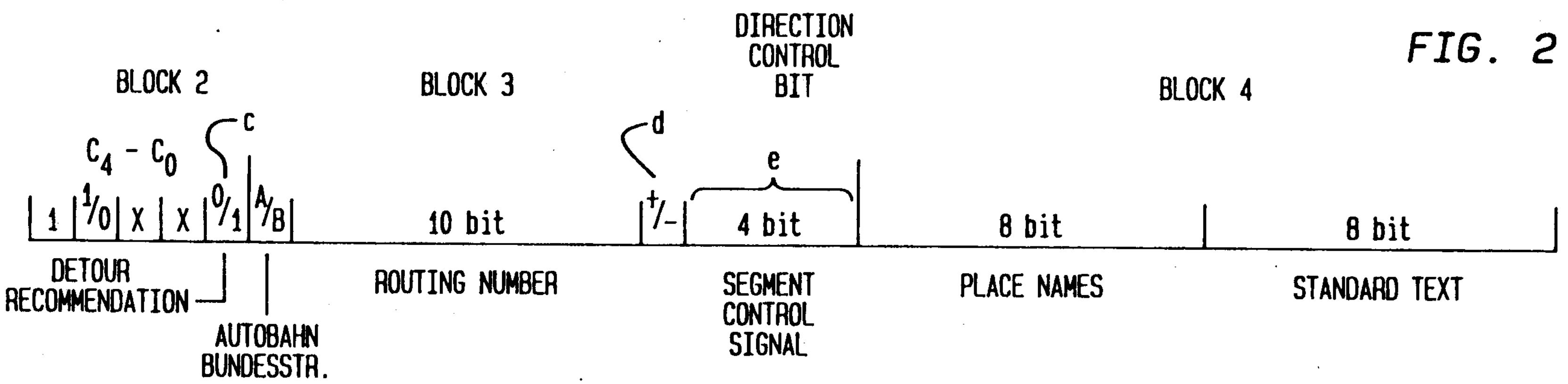
FIG. 2 is a detail from an RDS data packet or telegram for traffic announcements.
FIG. 3, is a table of a portion taken from memory in accordance with a feature of the invention.

FIG. 2 shows a detail from an RDS data packet or telegram for traffic announcements. The significant blocks here are blocks 2, 3 and 4. Each of these blocks includes 16 bits. In block 2, a detour control signal c is present, which is suitably occupied whenever a detour recommendation is made in addition to the traffic announcements.

In block 3, routing names with exit numbers are present, and in addition there is a direction control signal d and a segment control signal e. The direction control signal d indicates the travel direction to which the traffic announcement relates; the segment control signal e indicates the number of connections that are affected by the traffic obstruction.

In block 4, finally, addresses for place names and standard texts are stored in memory.

If 256 different place names are to be addressable, then eight bits of the place code number from block 4 are used for this purpose.

FIG. 3 shows a table of a memory portion from the memory device 12. Place names a, route names with exit numbers g, region names f and detour route names b are stored in memory fields 16. For the area of the Federal Republic of Germany, 65,536 different place names for local identification of traffic events are thus available. The other aforementioned information is associated in the same memory fields with the place names, each of which is stored only once, so that the other information can be read out via a common address h and from the read-out information only a selection needs to be made relating to which of the items of information are to be shown on the display device.

Figure 4:
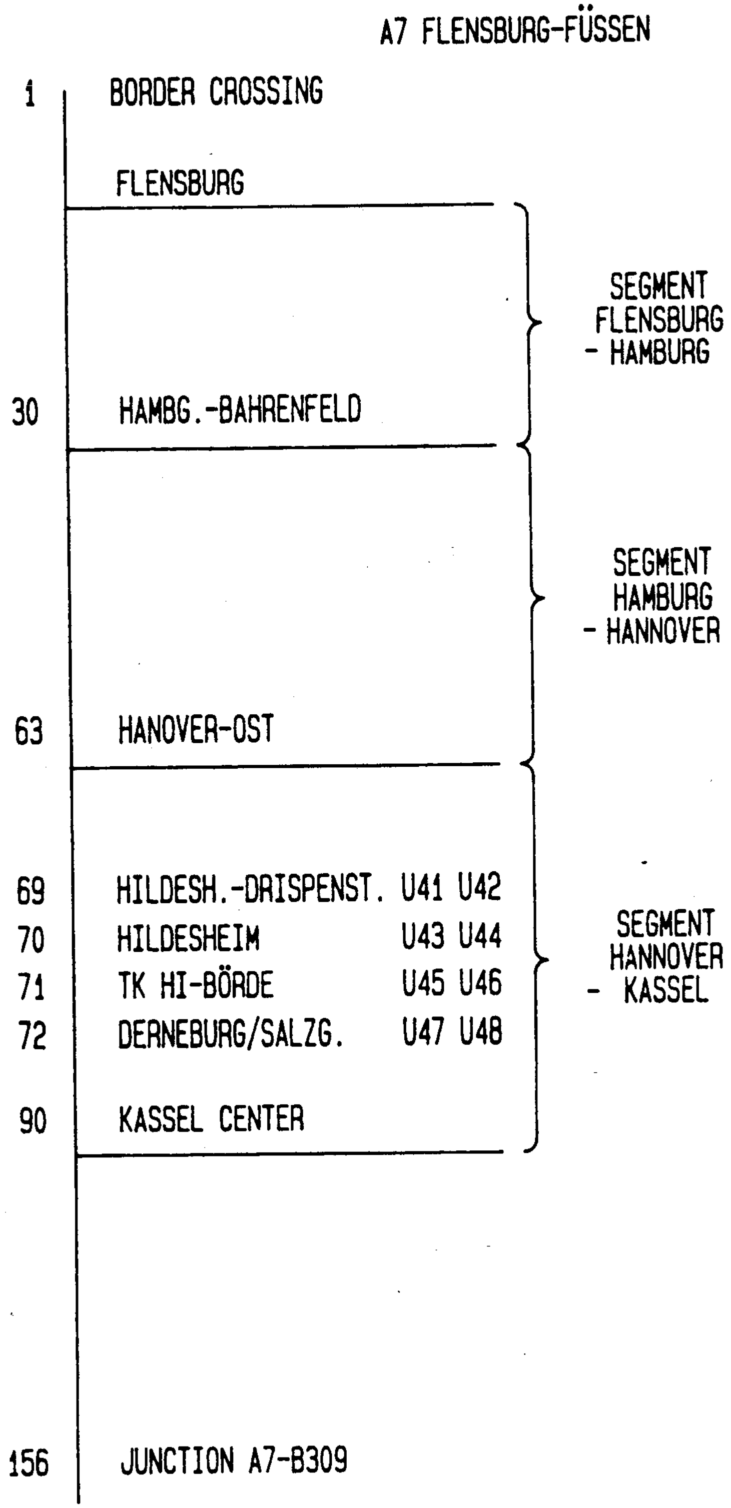
FIG. 4 is a graphic display of a route segment.

FIG. 4 shows a route segment of the Autobahn A7 from Flensburg to Fëssen in which the exit numbers, place names and detour route names are shown for the segment from Hannover to Kassel. Arrows indicate that the odd numbers apply to the detour route names for the north-south direction, while even numbers apply to the south-north direction. Traffic announcements pertaining to this segment of the route are shown in FIGS. 5 and 6.

Figure 5:
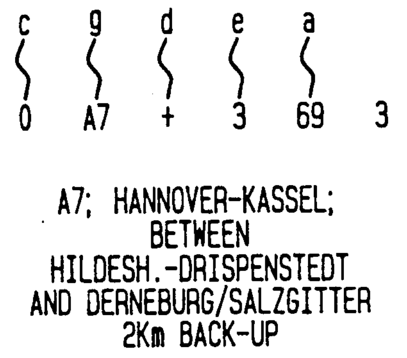
FIG. 5 shows a first traffic announcement without a detour recommendation.
Figure 6:
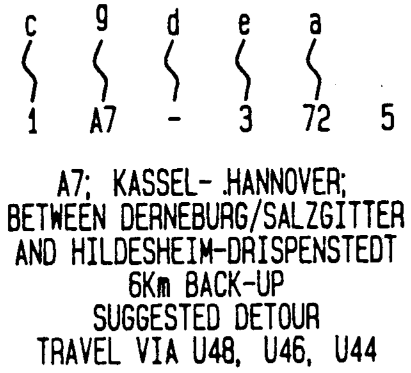
FIG. 6 shows a second traffic announcement with a detour recommendation.

In FIGS. 5 and 6, the RDS data packet or telegram is shown at the top, and on the bottom the clear text that appears on the display device after evaluation of the data packet or telegram is shown on the bottom. In FIG. 5, the detour control signal is c 0, which is evaluated as "no detour recommendation". The routing name A7 needs no further explanation; the direction control signal d is positive and means that the traffic obstruction affects the north-south direction.

This is followed by a connection number that can be read from the table shown in FIG. 4. The numeral 69 indicates the connecting point Hildesheim-Drispenstedt. By using the segment control signal e as an aid, it can be found that the next exit past the end of the traffic obstruction is three segments farther, or in other words is Derneburg/Salzgitter. The last indication is a factual indication and stands for a two-kilometer-long backup, or traffic jam.

FIG. 6 shows a traffic report for the opposite travel direction. In this case the detour control signal c is set to 1, meaning that a detour recommendation is made. The direction control signal d is negative; that is, the obstruction affects the south-north direction. The segment control signal e indicates that the obstruction extends onward for three segments, that is, beginning at exit 72 and extending to exit 69. From the concordance of the table shown in FIG. 4, this means that the obstruction is between Derneburg/Salzgitter and Hildesheim-Drispenstedt. The digit 5 in the factual information this time stands for a six-kilometer-long jam or backup.

For the detour recommendation, the even-numbered detour route names are selected by means of the direction control signal d. From the evaluation of the segment control signal e, it is determined that three segments are affected and thus three detour route names are selected. Finally, the detour control signal c has the effect that the selected detour route names, in this case U48, U46, U44, are also displayed.

Various changes and modifications may be made, and features described in connection with any one of the embodiments may be used with any of the others, within the scope of the inventive concept.

We claim:

1. A vehicular radio receiver, having a decoder (10) which decodes traffic announcements, received in encoded form in a data packet and generates a digital output signal including data characteristic of route segments to which an announcement pertains and a control bit indicating whether or not each announcement includes a detour recommendation, a memory device (12), having an address input (26) and a data output (28), and a plurality of memory fields (16), each field containing a detour recommendation and at least one route-specific characteristic, said address input (26) being connected to an output of said decoder (10);

means (14), connected (30,36) to said data output (28) of said memory device (12), for reading traffic announcement information out of a field of said memory device (12) and indicating it to a vehicle operator by at least one of visual and acoustical indications, and an evaluation circuit (18), having an input connected to an output of said decoder (10) and a control output (32) connected to an input of said indicating means (14), and controlling said indicating means (14) in accordance with said bit to selectively indicate or suppress said detour recommendation read out of said memory (12).

2. The radio receiver of claim 1, wherein said decoder output signal further includes a direction control bit and each memory field (16) contains a detour recommendation associated with each travel direction;

and wherein said evaluation circuit (18) controls said indicating means (14) in accordance with said direction control bit from said decoder (10) to suppress one of said detour recommendations read out of said memory (12).

3. The radio receiver of claim 1,
wherein
said evaluation circuit (18) responds to a segment control signal (e) contained in the data packet or telegram, by selecting which detour route name (b1, 2) associated with a route segment, among a succession of successive detour route means (bl ... bn) stored in said memory is indicated by said indicating means (14).

4. The radio receiver of claim 1,
wherein a plurality of place names (a) are each stored only once in the memory device (12) and detour route names (b), even with multiple association with one of the place names (a), are linked to only a single memory location (20) for this place name (a).

5. The radio receiver of claim 4,
wherein
names (f) of defined geographical regions are additionally associated with the place name (a) and are stored in memory in the memory device (12), thereby distinguishing between detours in different regions which have the same detour route name (b).

6. The radio receiver of claim 1,
wherein
said traffic announcements are encoded according to the Radio Data System (RDS) of the European Broadcasting Union and
the detour control bit (c) is formed by a bit present in block 2 of the RDS data packet or telegram.

7. The radio receiver of claim 2,
wherein
said traffic announcements are encoded according to the Radio Data System (RDS) of the European Broadcasting Union and
the direction control bit (d) is formed by a bit present in block 3 of the RDS data packet or telegram.

8. The radio receiver of claim 3,
wherein
said traffic announcements are encoded according to the Radio Data System (RDS) of the European Broadcasting Union and
a segment control signal (e) is provided, formed by a bit present in block 3 of the RDS data packet or telegram.

9. The radio receiver of claim 1,
further comprising
an input device (22) for selection of route-specific characteristics such as place names, travel direction, geographical region, input by said vehicle operator, and
a further memory device (24) coupled to an output of said input device (22) and storing these selected characteristics in memory, and
a logic linking member (30) having inputs connected to respective outputs of said further memory device (24) and of said memory (12), and an output connected to said indicating means (14), whereby the vehicle operator triggers appropriate indications in accordance with the selected characteristics.

* * * * *